(12) United States Patent
Haire et al.

(10) Patent No.: US 8,769,436 B2
(45) Date of Patent: Jul. 1, 2014

(54) ADAPTIVE UI REGIONS FOR ENTERPRISE APPLICATIONS

(75) Inventors: Michael John Haire, Foster City, CA (US); Arin Bhowmick, Fremont, CA (US); Kari Mochel, San Francisco, CA (US); David Danielson, Los Altos, CA (US); Rami Musa, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 502 days.

(21) Appl. No.: 12/368,948

(22) Filed: Feb. 10, 2009

(65) Prior Publication Data
US 2010/0205567 A1 Aug. 12, 2010

(51) Int. Cl.
G06F 3/048 (2013.01)
G06F 7/00 (2006.01)

(52) U.S. Cl.
CPC . *G06F 3/048* (2013.01); *G06F 7/00* (2013.01)
USPC ........... 715/840; 715/253; 715/241; 715/778; 715/781; 715/794

(58) Field of Classification Search
CPC ................................. G06F 3/048; G06F 7/00
USPC ......... 715/765, 789, 840, 241, 253, 762, 764, 715/778, 794
See application file for complete search history.

(56) References Cited

U.S. PATENT DOCUMENTS

| | | | |
|---|---|---|---|
| 6,697,824 B1 | 2/2004 | Bowman-Amuah | |
| 6,772,146 B2 | 8/2004 | Khemlani et al. | |
| 7,010,755 B2 * | 3/2006 | Anderson et al. | 715/778 |
| 7,068,291 B1 * | 6/2006 | Roberts et al. | 345/635 |
| 7,263,663 B2 | 8/2007 | Ballard et al. | |
| 7,366,991 B1 | 4/2008 | Snapkauskas et al. | |
| 2004/0066414 A1 * | 4/2004 | Czerwinski et al. | 345/781 |
| 2004/0133587 A1 | 7/2004 | Matsumoto et al. | |
| 2005/0071784 A1 * | 3/2005 | Klein et al. | 715/851 |
| 2005/0091098 A1 * | 4/2005 | Brodersen et al. | 705/8 |
| 2006/0195385 A1 * | 8/2006 | Khetrapal et al. | 705/37 |
| 2007/0101004 A1 | 5/2007 | Loen | |
| 2007/0208991 A1 | 9/2007 | Rider | |
| 2008/0195429 A1 * | 8/2008 | Hoff | 705/7 |
| 2009/0037195 A1 * | 2/2009 | Hoff | 705/1 |
| 2009/0271292 A1 * | 10/2009 | Khetrapal et al. | 705/26 |

FOREIGN PATENT DOCUMENTS

WO 2006063016 6/2006

OTHER PUBLICATIONS

"Business Users—The New SAP CRM Web Client User Interface," http://www.sapdesignguild.org/community/readers/reader_crm_web_client.asp, retrieved May 2010.
"My Yahoo," http://my.yahoo.com, retrieved Oct. 2008.
"Windows Live," http://my.live.com, retrieved Oct. 2008.
"iGoogle," http://www.google.co.in/ig?hl=en, retrieved May 2010.

(Continued)

*Primary Examiner* — Tadeese Hailu
(74) *Attorney, Agent, or Firm* — Marger Johnson & McCollom PC

(57) ABSTRACT

An adaptive region system can include an adaptive region module and a display module. The adaptive region module can include a mini region button panel module capable of generating a mini region button panel having multiple mini region buttons, a view panel module capable of generating a view panel having multiple view buttons, and a region panel module capable of generating a region panel having multiple mini regions. The display module can visually display the mini region button panel, the view panel, and the region panel.

24 Claims, 14 Drawing Sheets

(56) References Cited

OTHER PUBLICATIONS

"Netvibes," http://www.netvibes.com, retrieved May 2010.

"Pageflakes," http://www.pageflakes.com, retrieved May 2010.

"Microsoft CRM Customization," Microsoft Corporation, Apr. 2003, 18 pages.

Arefi, F., et al., "Towards customized user interface design environments," (Abstract) http://ieeexplore.ieee.org/iel2/376/6139/00238838.pdf?arnumber=238838, retrieved Oct. 2008.

Weld, Daniel, "What users want," (Abstract) http://portal.acm.org/citation.cfm?id=604045.604049&coll=Portal&dl=GUIDE&CFID=78804492&CFTOKEN=10279630, retrieved Oct. 2008.

"IBM Announces Web Site Personalization Software," http://findarticles.com/p/articles/mi_pwwi/is_200008/ai_mark01015774, retrieved Oct. 2008.

"Adobe Dashboard," http://examples.adobe.com/flex3/devnet/dashboard/main.html, retrieved Oct. 2008.

"Adobe FlexStore," http://examples.adobe.com/flex2/inproduct/sdk/flexstore/flexstore.html, retrieved Oct. 2008.

"Oracle's Sales Prospector product (Released 2008)," http://www.oracle.com/applications/oracle-prospector-data-sheet.pdf, retrieved Oct. 2008.

* cited by examiner

Create Activity

Create: [Activity ▼]

Subject: [                    ]

Type: [  ▼]　　Planned End: [📅]

Owner: [  ▼]　　Due Date: [📅]

Contacts: [  ▼]　　Status: [  ▼]

[Save]

X — 604
602 — Save
600 — (window)

FIG. 6

ABAPTIVE UI REGIONS FOR ENTERPRISE
APPLICATIONS

BACKGROUND

In today's Enterprise software applications, actions and data displays are typically centered around major business objects. For example, actions and data displays in a Customer Relationship Management (CRM) application typically focus on major business objects such as Marketing Leads and Sales Opportunities. These types of major business objects typically have a wide variety of related objects such as associated customers, products, marketing campaign information, competitor information, notes, and scheduled activities, for example.

A typical Enterprise software application undesirably limits a user's view of related objects within an object detail page or any page that has distinct pieces of information to only one at a time. Such an application generally limits a user's ability to view the pertinent data to either static tabs (e.g., that disadvantageously allow the user to see only one related object or information type at a time) or a long scrolling list of all sub-regions that are specific to the related objects or pertinent pieces of information.

In some applications, the data provided to the user can be organized in a scrolling list of sub-regions that show all related objects or pertinent pieces of information concurrently. However, such a list is often undesirably long, which can negatively impact the user's productivity and/or efficiency. Also, while there may be configuration options available to administrators of the Enterprise application (e.g., to modify what content is displayed to the user), the data display is still limited to an all-or-one scenario.

For example, a sales professional tends to spend a lot of time dealing with sales opportunities (e.g., leads or prospects that resulted from marketing campaigns). Typical Enterprise applications can be organized around those sales opportunities but, as the sales professional works through the opportunities (e.g., by calling customers or meeting with them), he or she must spend a significant amount of time and energy (e.g., by repeatedly drilling down into a specific opportunity) in order to find the desired information (e.g., the name of the customer, the total projected revenue, and various types of associated information).

Unfortunately, the current applications described above provide a non-optimal user experience. More specifically, today's Enterprise applications do not provide an end user with the flexibility to decide what pieces of information the user would like to see at the same time. Current applications also fail to provide the end user with control as to how the desired information is positioned. The lack of flexibility and user control directly impact a user's productivity as the user is required to navigate back and forth between related objects or pertinent pieces of information (e.g., on tabs) or by scrolling back and forth within a long list of sub-regions.

Thus, there remains a need for a way to address these and other problems associated with the prior art.

BRIEF DESCRIPTION OF THE DRAWINGS

FIG. 6 illustrates an example of an activity creation pop-up window in accordance with implementations of the disclosed technology.

DETAILED DESCRIPTION

Figure 1:
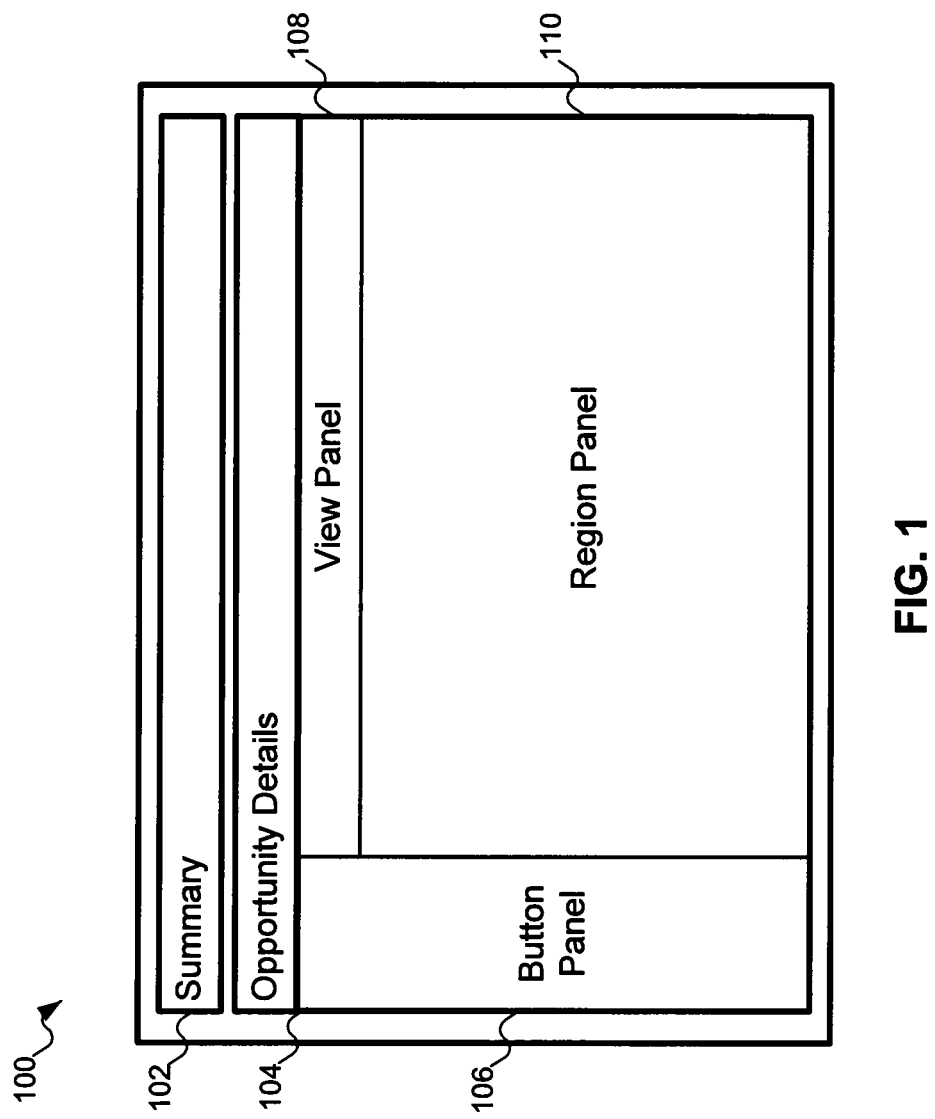
FIG. 1 illustrates an example of an opportunity having a summary section and an adaptive region, as displayed in accordance with implementations of the disclosed technology.

Implementations of the disclosed technology can advantageously provide an Enterprise application end user (e.g., on-premise customers and/or Software-as-a-Service (SaaS) Enterprise customers) with a fluid, highly configurable workspace that can simultaneously display multiple pieces of information (including related objects, for example) that the user desires to view. For example, implementations of the disclosed technology can provide the end user with control (e.g., at run-time) to reconfigure the content, arrangement, and visibility of related object windows in their workspace.

Implementations of the disclosed technology can advantageously present an end user with summary regions (e.g., regions that provide highly summarized information pertaining to the corresponding region). Such implementations can enable the user to maximize the summary regions (e.g., in order to see additional data and attributes) as well as to gain access to allowable edit operations for a particular related object. For example, a user can "drill down" on the contents of a summary window to launch other task flows and system dialogs.

Implementations of the disclosed technology can include a user interface (UI) or dashboard that can simultaneously display (e.g., to a user) multiple related objects and pertinent pieces of information. The UI can also advantageously enable the user to partially or completely customize the view (e.g., layout or arrangement) of the objects and information to be displayed (e.g., at runtime). For example, a user can drag-and-drop multiple mini regions within the region panel of an adaptive region as described herein. A save feature (e.g., invoked via a "Save View" button) can allow a user to save the customized view (e.g., for future use).

The actions described above, as well as various other types of actions, can be performed entirely within the context of an end user's current role (e.g., based on his or her credentials) in the system and, therefore, provide further advantages in that the actions do not require any specialized administrative access or support.

Certain embodiments can include a UI (e.g., that displays desired content in an adaptive region) that is oriented toward assisting an end user in achieving his or her business goals more easily, efficiently, and productively. For example, such a UI can help a Sales Representatives improve his or her sales or help a Marketing Analyst qualify certain leads. Such embodiments can thus deliver useful insights to the end user instead of simply tracking the state and status of certain business objects. Also, the built-in flexibility and usefulness of such a UI can effectively remove barriers to a user's ability to optimize his or her experience with the UI.

Implementations of the disclosed technology can cater to the expertise level (e.g., beginner to advanced) of an end user via built-in flexibility that allows the user to customize the layout and information displayed in accordance with his or her needs or wishes, for example. In contrast, current systems merely provide a "one size fits all" approach in which applications only provide one or all displays of related object types and pertinent information.

Implementations of the disclosed technology can advantageously include an adaptive region having a button panel, a region panel, and a view panel. For example, FIG. 1 illustrates an example of an opportunity 100 (e.g., a sales opportunity) having a summary section 102 and an adaptive region 104, as displayed in accordance with implementations of the disclosed technology. In the example, the adaptive region 104 is titled "Opportunity Details" and includes three panels: a button panel 106, a view panel 108, and a region panel 110. The displayed opportunity 100 can also have a Save button (not shown) or other types of inputs (via buttons, for example) to invoke certain actions with respect to the opportunity 100.

As used herein, the summary section of an opportunity (such as the summary section 102 of FIG. 1) can provide information, in summary form, pertaining to the opportunity. For example, the summary section can provide any or all of the following types of data: Name, Primary Owner, Customer, Territory, Created By, Currency, Revenue, Win Probability, Status, Creation Date, Close Date, Sales Stage, Lead Quality, Source, Channel.

As used herein, an adaptive region (such as the adaptive region 104 of FIG. 1, for example) generally refers to a region that is used to display content in connection with a page and/or header in order to provide a space that gives an end user a high degree of control over the displayed content (e.g., the amount and organization of the information that the user wishes to view). Adaptive regions are advantageously used in place of any of the sub-regions, sub-tabbed regions, or form layout content of current Enterprise applications.

As used herein, a region panel (such as the region panel 110 of FIG. 1, for example) is an integral component of an adaptive region. The region panel generally includes space that is used to display the content with which an end user will interact. In certain implementations (e.g., a "normal mode"), the region panel can be populated with multiple mini regions (e.g., that are related to a corresponding button within a button panel of the adaptive region).

As used herein, a mini region generally refers to an area (e.g., window) that is capable of displaying a targeted summary of information within the region panel and that can provide both information and actions to an end user. A mini region can thus enable the user to advantageously fulfill frequent, basic tasks that relate to a particular opportunity, for example.

A mini region can be maximized to completely fill the region panel. When maximized, the mini region can advantageously provide the user with pertinent information and tools (or access to tools) that might not be visibly displayed otherwise (e.g., in order to edit data relating to the mini region). A maximized mini region can be minimized by way of a minimize function, which can return the mini region to the state (e.g., size and location) it maintained prior to being maximized.

In certain implementations, a user can reorganize mini regions within the region panel by using drag-and-drop techniques (e.g., by selecting the header section of a mini region and dragging it to a different location). For example, if a user selects a second mini region and drags it on top of (or before) the first mini region, the two mini regions would effectively swap locations with each other within the region panel.

As used herein, a button panel (such as the button panel 106 of FIG. 1, for example) generally includes multiple buttons that each correspond to a particular mini region. The buttons within the button panel can enable users to advantageously control which mini regions are in view and which mini regions are hidden. The buttons within the button panel can also enable the users to execute maximize and minimize functions on the associated mini regions.

The button panel can be advantageously expanded or collapsed by end users. For example, a user can collapse the button panel to reclaim real estate (e.g., increase the area of the region panel to reduce visual clutter). The buttons in the button panel can show analytic information (such as textual information or graphs, for example) and can also provide the user with actions that can be performed directly on the object (such as adding a new record or displaying a mini region in maximized mode, for example).

In situations where the region panel contains summary regions, the button panel can indicate which summary regions are in view and which summary regions are hidden. For example, a user can click on a button corresponding to a hidden summary region to expose it and, if the summary region is visible, the user can click on the corresponding button to hide it.

In situations where the region panel contains a maximized mini region, the corresponding button can appear as being highlighted (e.g., displayed in a color that visibly contrasts with the color(s) of the other buttons in the button panel). When in this mode, the user can click any of the other buttons in the button panel in order to toggle between maximized views of other regions. For example, if a first mini region is maximized (and the corresponding first button is highlighted), the user can click on a second, non-highlighted button, thereby resulting in the displayed view being switched from displaying the maximized first mini region to displaying, in maximized form, the second mini region (which corresponds to the second, non-highlighted button).

Because mini regions can be arranged independently (e.g., within the region panel), certain embodiments of the disclosed technology can include the attachment of a "strength value" (e.g., measure of importance) to each mini region.

Such strength values can be attached manually (e.g., by a user via a UI) or automatically (e.g., in accordance with certain rules). The strength values can be used in connection with an auto-layout or auto-arrange feature. For example, an auto-arrange tool can, upon opening of the application, cause the displayed mini regions to be arranged in descending order of strength values.

In certain embodiments, the mini region having the highest strength value can be permanently (e.g., until the mini region no longer has the highest strength value) displayed in a particular location (e.g., the uppermost, leftmost portion) of the view, whereas the mini region having the lowest strength value can be permanently (e.g., until the mini region no longer has the lowest strength value) displayed in a different location (e.g., the bottommost, rightmost portion) of the view. The strength values can also advantageously enable the system to automatically determine and implement an appropriate layout in terms of which mini regions are open (e.g., visible), for example.

As used herein, a view panel (such as the view panel 108 of FIG. 1, for example) can include a series of buttons that can enable an end user to quickly and easily switch (e.g., toggle) between different views (e.g., configurations of the button panel and/or region panel). A view can be used, for example, to store changes made to the view for each instance of the object (e.g., sales opportunity) for which the adaptive region is used. Changes made to a particular view will generally not change any other views that correspond to other instances of the object, unless there are instructions to the contrary (e.g., entered by a user). A save feature (e.g., a "Save View" button) can enable a user to save his or her own customized configurations of regions and layouts for re-use in later sessions, for example.

Consider an example involving a sales process. In the example, a first view can be optimized for the early stages of the sales process and show the following mini regions: Contacts, Sales Team, and References. A second view can be optimized for the later stages of the sales process (e.g., at closing) and show the following mini regions: Contacts, Quoted Products, and Notes.

Figure 2:
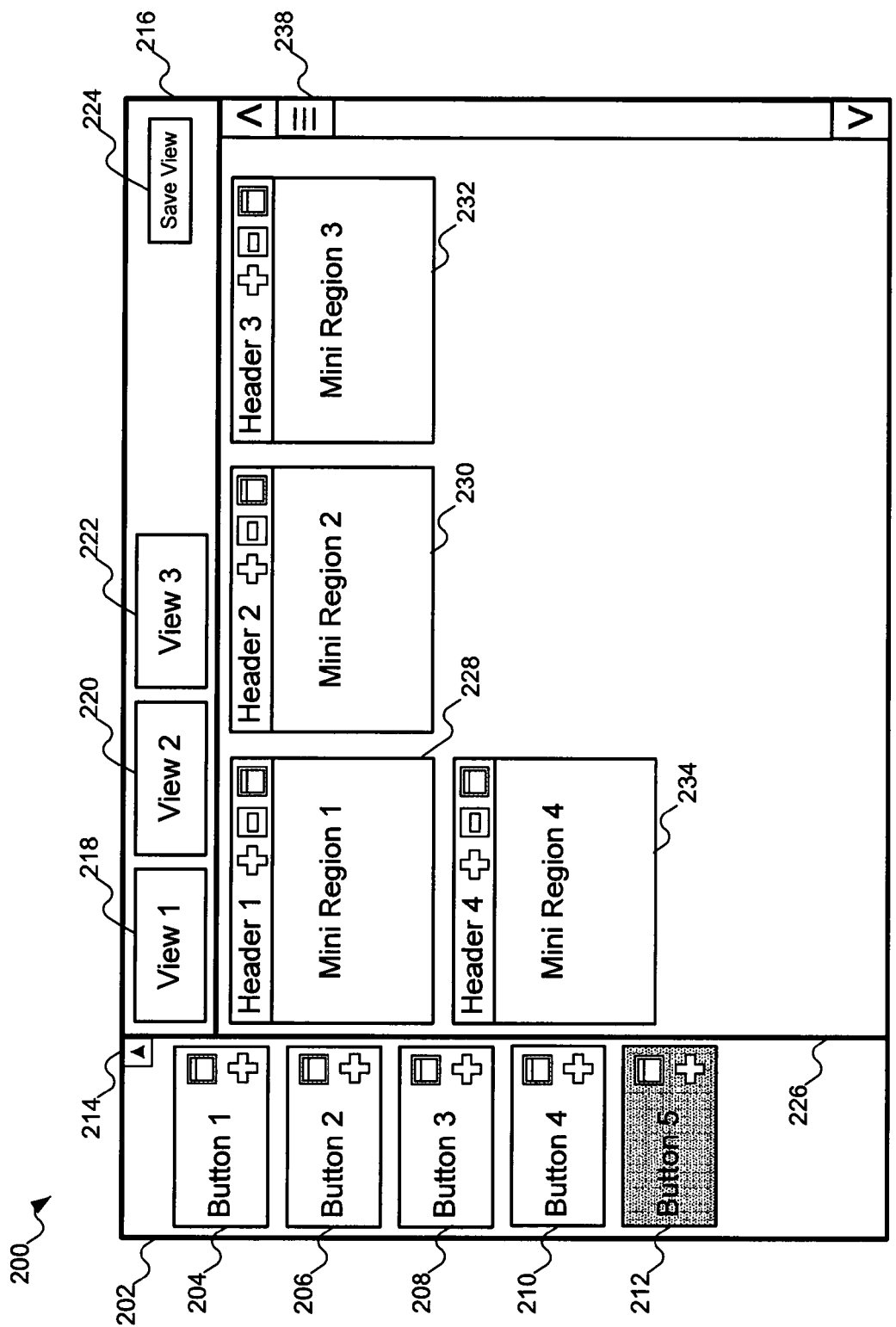
FIG. 2 illustrates an example of the adaptive region of an opportunity as displayed in accordance with implementations of the disclosed technology.

Exemplary Adaptive Regions in Accordance with Implementations of the Disclosed Technology FIG. 2 illustrates an example of an adaptive region 200 (e.g., corresponding to a particular sales opportunity) as displayed in accordance with certain implementations of the disclosed technology. For example, the adaptive region 200 can correspond to the Opportunity Details section 104 of the opportunity 100 displayed in FIG. 1. In the example, the adaptive region 200 has a button panel 202, a view panel 216, and a region panel 226.

The button panel 202 of the adaptive region 200 includes three buttons labeled "Buttons 1-5" (204-212, respectively) and an expand/collapse button 214. Each button can correspond to a particular mini region, for example, and can also provide a user with any or all of the various button functionalities as described herein. The expand/collapse button 214 is described below.

The view panel 216 of the adaptive region 200 includes three view buttons labeled "Views 1-3" (218-222, respectively) and a "Save View" button 224. Each view button can correspond to a particular view (e.g., layout or arrangement of the panel region 226 or entire adaptive region 200), for example, and can also provide a user with any or all of the various view functionalities as described herein. The "Save View" button 224 can allow the user to save the current view in order to capture changes made to the view, for example.

The region panel 226 of the adaptive region 200 includes four mini regions labeled "Mini Regions 1-4" (228-234, respectively). In the example, each of the four Mini Regions 1-4 (228-234) corresponds to one of the first four Buttons 1-4 (204-210), respectively, and can display pertinent information depending upon the type of the mini region, for example, and can also provide a user with any or all of the various mini region functionalities as described herein.

Button 5 (212) does not have a corresponding mini region in FIG. 2 because the mini region is currently minimized. When a mini region is minimized, the button corresponding to the minimized mini region can be visually differentiated from other buttons that correspond to non-minimized mini regions. For example, the button can be patterned or shaded, as illustrated by the shading of Button 5 (212) in FIG. 2. Alternatively, a digital watermark can be used in connection with the button to signify that the corresponding mini region is minimized.

In the example, the region panel 226 also includes a scroll bar 238 for situations where the number of mini regions exceeds the number of mini regions that can be simultaneously visually displayed (e.g., on a user's monitor). A user can use the scroll bar 238 to scroll down the region panel 226, for example, to see mini regions that are situated within a bottom, non-displayed portion of the region panel 226 and, therefore, are not simultaneously visually displayed with mini regions that are situated within an upper portion of the region panel 226.

Figure 3:
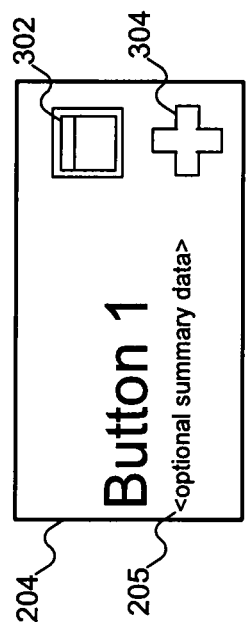
FIG. 3 provides a closer view of one of the buttons in the button panel of the adaptive region illustrated in FIG. 2.

Exemplary Buttons in Accordance with Implementations of the Disclosed Technology FIG. 3 provides a closer view of the button labeled "Button 1" (204) in the button panel 202 of the adaptive region 200 illustrated in FIG. 2. Button 1 (204) has a maximize/minimize button 302 (e.g., maximize/minimize icon) that can be used to maximize or minimize the corresponding mini region that corresponds to Button 1 (204) (i.e., Mini Region 1 (228) of FIG. 2). Button 1 (204) also has an add button 304 (e.g., add icon) that can be used, for example, to add content (e.g., information) to the corresponding mini region (i.e., Mini Region 1 (228)).

Figure 5:
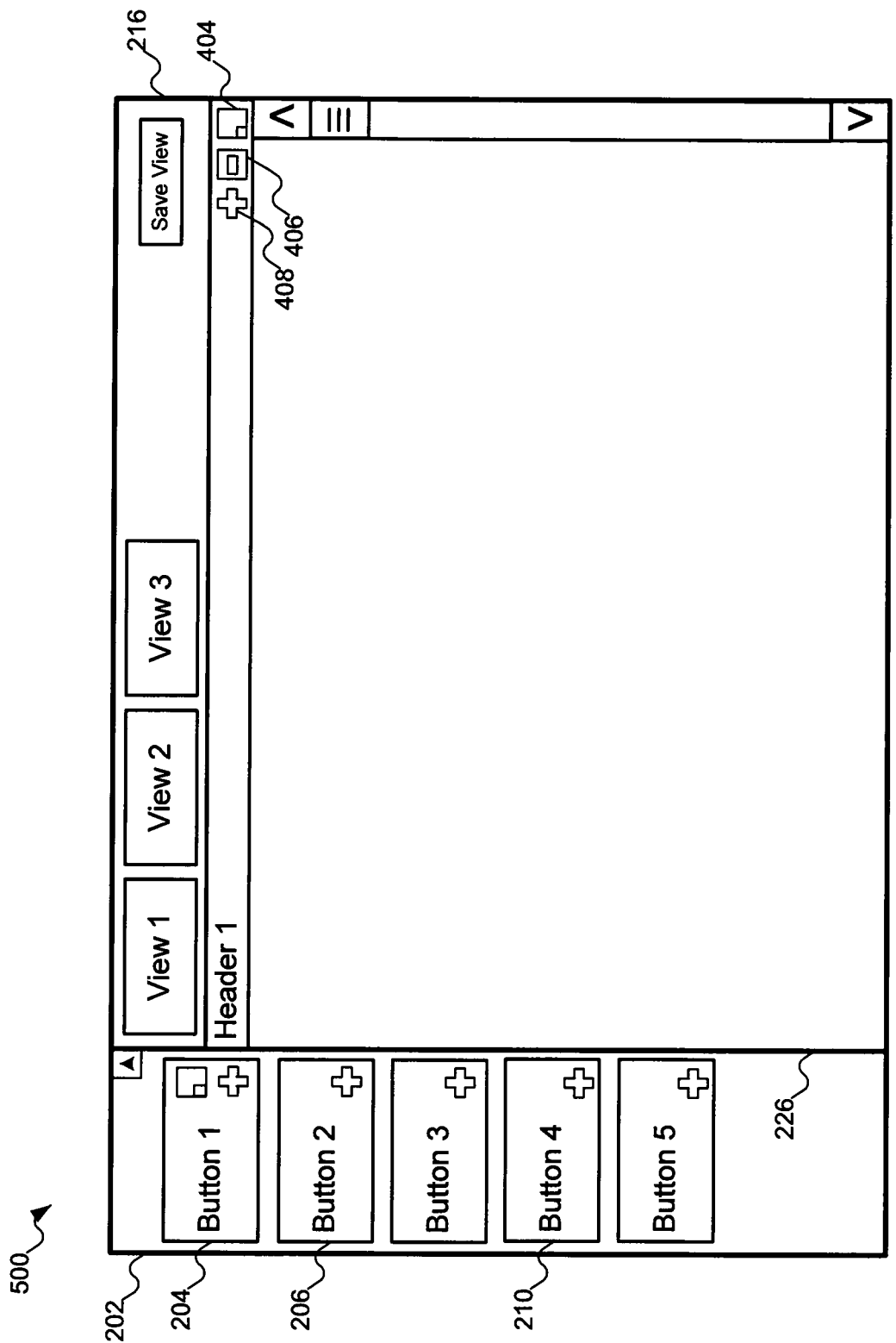
FIG. 5 illustrates an example of a maximized mini region as displayed in accordance with implementations of the disclosed technology.

The maximize/minimize button 302 can change based on the state of the corresponding Mini Region 1 (228). For example, when Mini Region 1 (228) is displayed but not maximized (e.g., as shown in FIG. 2), the maximize/minimize button 302 of Button 1 (204) can take the form of a maximize button. When the maximize/minimize button 302 of Button 1 (204) is in the form of a maximize button, a selection of the maximize/minimize button 302 will result in the maximization of Mini Region 1 (228) (e.g., as shown in FIG. 5). Once Mini Region 1 (228) has been maximized, the maximize/minimize button 302 can take the form of a minimize button. When the maximize/minimize button 302 of Button 1 (204) is in the form of a minimize button, a selection of the maximize/minimize button 302 will result in Mini Region 1 (228) returning back to its original state (e.g., as shown in FIG. 2).

In certain embodiments, Button 1 (204) (or any of Buttons 1-5 (204-212) of FIG. 2) can be any of the following types of buttons: Activity Center, Customer Contacts, Customer Profile, My Colleagues, Discussions, Notes, Opportunity Team, Customer Service Requests, Product, and Revenue. One having ordinary skill in the art will appreciate that this list is not exhaustive and that there are various other button types that buttons such as Button 1 (204) can have.

Button 1 (204) can display certain information 205 depending on the button type. For example, Button 1 (204) can display: the number of activities or contacts (e.g., "7

Total") if it is an Activity Center or Customer Contacts button, respectively; the number of new and/or existing discussions (e.g., "3 New Posts, 3 Threads") if it is a Discussions button; the number of new and/or total notes (e.g., "7 New, 25 Total") if it is a Notes button; the number of new products (e.g., "4 New") if it is a Product button; or the amount of revenue and/or number of products (e.g., "$1,000,000, 2 Products") if it is a Revenue button.

As discussed above, buttons corresponding to mini regions that are displayed (e.g., in a region panel) can be differentiated from buttons corresponding to mini regions that are not displayed. For example, if Mini Region 1 (228) is displayed in the region panel 226 of FIG. 2, then Button 1 (204) can be distinguished from Buttons 2-5 (206-212) by way of different shading, patterning, or other visual indication.

Figure 4:
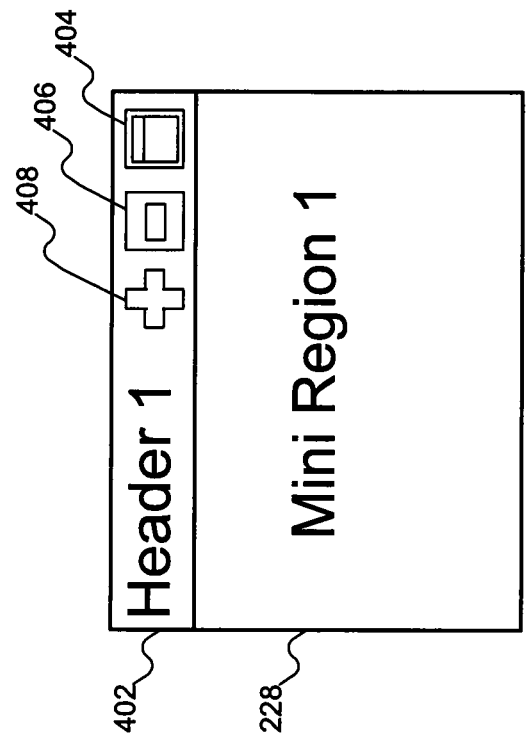
FIG. 4 provides a closer view of one of the mini regions in the region panel of the adaptive region illustrated in FIG. 2.

Exemplary Mini Regions in Accordance with Implementations of the Disclosed Technology FIG. 4 provides a closer view of the mini region labeled "Mini Region 1" (228) in the region panel 226 of the adaptive region 200 illustrated in FIG. 2. Mini Region 1 (228) has a header section labeled "Header 1" (402). Mini Region 1 (228) also has a maximize/minimize button 404, a minimize-to-button button 406, and an add button 408. The maximize/minimize button 404 can change its format based on the state of Mini Region 1 (228). Mini Region 1 (228) can have a virtually unlimited amount of data (e.g., via data fields) within it that can provide even more data to a user (e.g., in response to the user clicking on a particular field).

For example, a user can click on an entry in a Customer Contacts mini region to see Telephone Number (e.g., the contact's phone number, Last Interaction (e.g., the date of the user's or anybody's last interaction with the contact), and Last Interacted With (e.g., the identity of the user or other person that last interacted with the contact). The user can also click on a Customer Service Request field to see details associated with a particular customer service request for the contact. The user can use these fields to advantageously interact with the content inside the mini region. For example, the user can perform an "inline edit" (e.g., change Owner or Status).

In the example, the maximize/minimize button 404 can be used to maximize Mini Region 1 (228) (e.g., by expanding Mini Region 1 (228) to completely take up the space allocated to the region panel 226). In certain embodiments where Mini Region 1 (228) is in maximized form, the maximize/minimize button 404 can be removed from view.

The minimize-to-button button 406 can be used to minimize Mini Region 1 (228) (e.g., by no longer displaying Mini Region 1 (228) in the region panel (226) and indicating the removal of Mini Region 1 (228) via Button 1 (204) by way of shading, patterning, or some other visual indication that Mini Region 1 (228) is no longer displayed in the region panel 226).

In the example, the add button 408 (or the add button 304 of FIG. 3) can be used to add content (e.g., information) within Mini Region 1 (228) itself. The type of content that can be added to Mini Region 1 (228) can depend on what kind of mini region Mini Region 1 (228) is, for example. For example, if the mini region is an Activity mini region, then clicking on the add button 408 can result in the creation of a new activity (e.g., sales activity) within the Activity mini region.

Mini Region 1 (228) can display certain information depending on the mini region type. For example, if Mini Region 1 (228) is an Activity mini region, then Mini Region 1 (228) can display the following types of information: Description, Primary Contact, Primary Team Member, Type, Start, Due, Status, and Priority. If Mini Region 1 (228) is a Customer Contact mini region, then Mini Region 1 (228) can display the following types of information: Primary, Name, Email Address, Phone Number, Title, Interaction Index, and Closest Internal Relation. If Mini Region 1 (228) is a Customer Contact mini region, then Mini Region 1 (228) can also display the following types of sub-information: Opportunity Contacts and All Customer Contacts. One having ordinary skill in the art will appreciate that mini region types are not limited to the types discussed above; rather, there are various other mini region types that mini regions such as Mini Region 1 (228) can have.

FIG. 5 provides an example of a screenshot 500 of the opportunity 200 after a maximize operation has been performed on Mini Region 1 (228) (e.g., by clicking on the maximize/minimize button 404 as illustrated in FIG. 4). In the example, Mini Region 1 (228) now takes up the entire space allocated to the region panel 226. Mini Region 1 (228) still displays a maximize/minimize button 404, a minimize-to-button button 406, and an add button 408.

While the functionality invoked by each of the minimize-to-button button 406 and add button 408 remains the same as in FIG. 4, the maximize/minimize button 404, if clicked on in FIG. 5, would now result in a minimize operation on Mini Region 1 (228) (e.g., by returning Mini Region 1 (228) to the same size as illustrated in FIG. 2) because Mini Region 1 (228) is displayed in maximized form in FIG. 5. Once Mini Region 1 (228) is minimized within the region panel 226, the maximize/minimize button 404 would then invoke a maximize operation on Mini Region 1 (228) if clicked upon as Mini Region 1 (228) would be in minimized form.

While Mini Region 1 (228) is maximized, the button stack can be used to allow a user to cycle through some or all of the other mini regions in maximized form. For example, if a user were to click on Button 2 (206), the corresponding Mini Region 2 (230) would now be displayed, in maximized form, instead of Mini Region 1 (228). If the user were then to click on Button 4 (210), the corresponding Mini Region 4 (234) would now be displayed, in maximized form, instead of Mini Region 2 (230).

While the button stack can be used to cycle through the other mini regions that are in maximized form, the minimize/maximize button 302 will only be shown on the selected button in the button stack. For example, so long as Mini Region 1 (228) is in maximized form, only the button corresponding to Mini Region 1 (228) in the button stack 202 (i.e., Button 1 (204)) will display a minimize/maximize button 302 (e.g., as shown in FIG. 3). If a user were to then click on Button 2 (206), the corresponding Mini Region 2 (230) would be displayed in maximized form and the minimize/maximize button 302 would disappear from Button 1 (204) and now be displayed on Button 2 (206) since that is the button corresponding to the mini region that is now in maximized form (i.e., Mini Region 2 (230)).

FIG. 6 illustrates an example of an add interface 600 (e.g., invoked by an add button such as the add button 304 of FIG. 3 or the add button 408 of FIGS. 4 and 5). The add interface 600 can allow the user to enter various types of information as part of the content being added (e.g., to the mini region corresponding to the add button that invoked the add interface 600). The add interface 600 has a Save button 602 that can be used to save the data (e.g., new activity) being entered via the add interface 600. The add interface 600 also has a Close icon 604 that can be used to cancel the add interface 600 (e.g., stop the creation of the new activity).

In the example, the add interface 600 is a Create Activity event that allows a user to add an Activity (e.g., to an Activity mini region). The user can add details such as Type (e.g., Milestone, Research, or Preparation), Owner, Contacts, Planned End (e.g., using a calendar function), Due Date (e.g., using a calendar function), and Status (e.g., Scheduled, In Progress, Complete, or Overdue) in connection with the Activity.

While the add interface 600 illustrated in FIG. 6 is in the form of a pop-up window that has multiple data fields, one having ordinary skill in the art will appreciate that there is a wide variety of ways to enter content (e.g., data) into a mini region and that the pop up window shown in FIG. 6 should not be construed as being limiting in any fashion.

Figure 7:
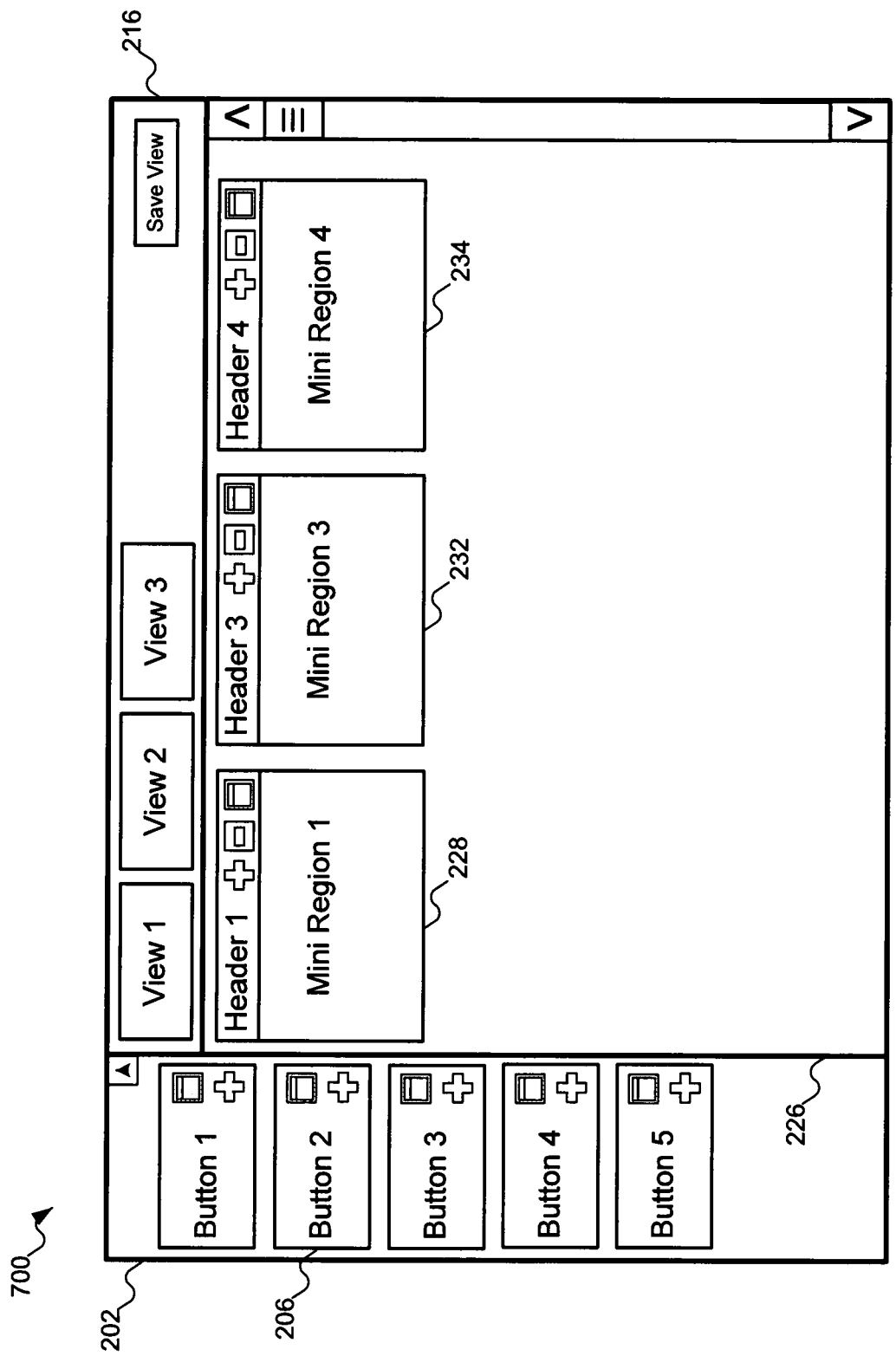
FIG. 7 illustrates an example of an adaptive region after the removal of a particular mini region, as displayed in accordance with implementations of the disclosed technology.

Exemplary Customizations of an Adaptive Region in Accordance with Implementations of the Disclosed Technology FIG. 7 illustrates an example of a screenshot 700 of the opportunity 200 illustrated in FIG. 2 after Mini Region 2 (230) is minimized or closed (e.g., removed from the region panel 226). In the example, the minimization of Mini Region 2 (230) causes Mini Regions 3 and 4 (232 and 234, respectively) to "move up" in terms of display order. In other words, Mini Region 3 (232) is now displayed in the space that had been occupied by Mini Region 2 (230) prior to minimization, and Mini Region 4 (234) is subsequently (or concurrently) displayed in the space that had been occupied by Mini Region 3 (232) prior to its "move."

There are several ways to invoke the referenced minimization operation on Mini Region 2 (230). For example, a user can click on Button 2 (206) directly or on the maximize/minimize button of Button 2 (206) (e.g., similar to the maximize/minimize button 302 of Button 1 (204), as illustrated in FIG. 3) and, once Mini Region 2 (230) is minimized, Button 2 (206) can be visually altered (e.g., shaded) to indicate that Mini Region 2 (230) has been minimized. Alternatively, a user can click on the maximize/minimize button (e.g., similar to the maximize/minimize button 404 of Mini Region 1 (228), as illustrated in FIG. 4) of Mini Region 2 (230).

One having ordinary skill in the art will appreciate that there are several other mechanisms that can be used to invoke the minimization operation of a mini region. In certain embodiments, for example, a user can double-click on either the header section of the mini region or single-click on the corresponding button to minimize the mini region. Alternatively, in certain embodiments, a user can drag-and-drop the mini region onto the button panel in order to minimize the mini region.

Figure 8:
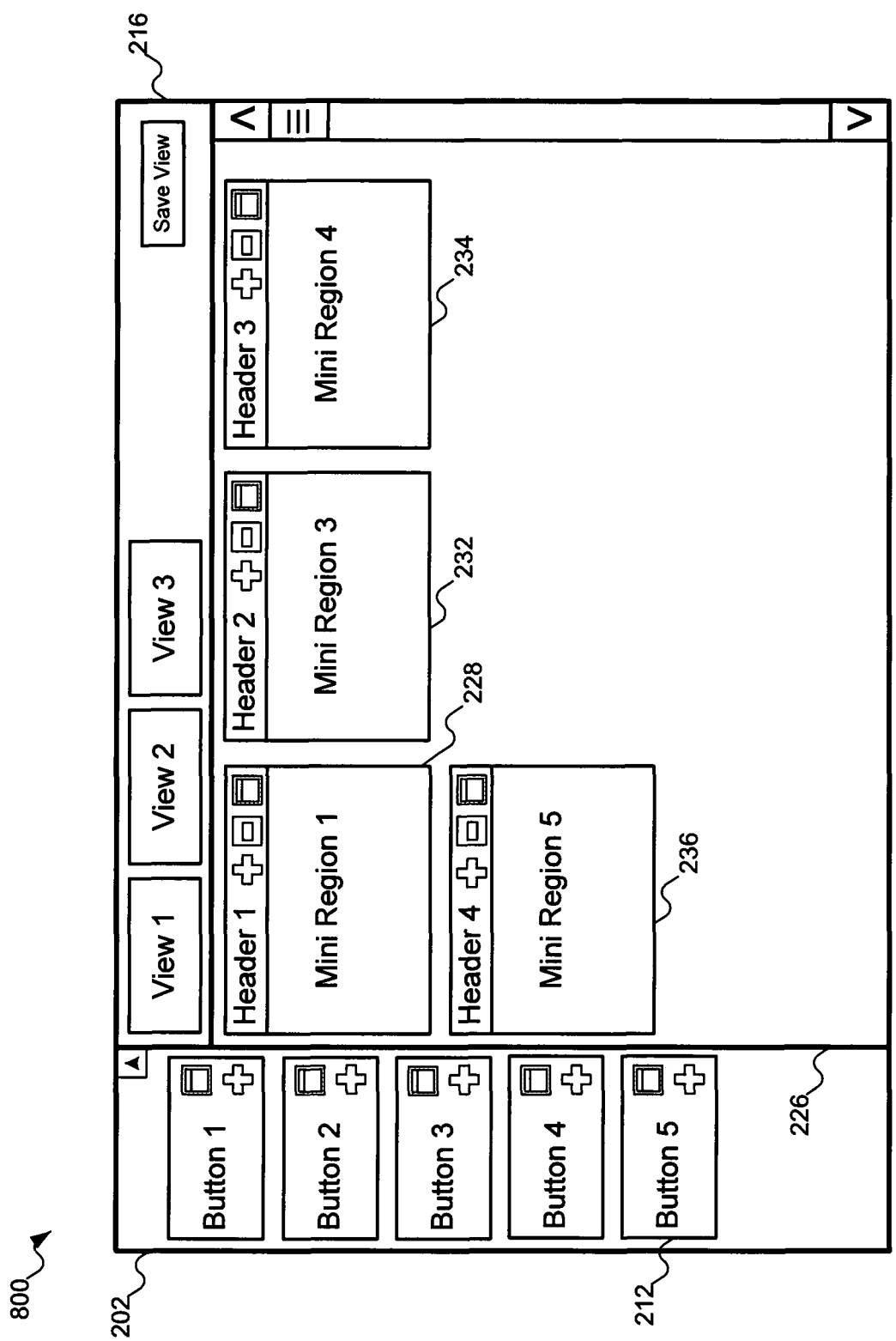
FIG. 8 illustrates an example of the adaptive region after the addition of a particular mini region, as displayed in accordance with implementations of the disclosed technology.

FIG. 8 illustrates an example of a screenshot 800 of the opportunity as displayed in FIG. 7 but after the addition or opening of Mini Region 5 (236) to the region panel 226. In the example, Mini Region 5 (236) is added to the next space after Mini Region 4 (234), which is the "next available spot" (e.g., the space immediately following the last mini region in terms of display order). In various implementations of the disclosed technology, a mini region can be displayed virtually anywhere within the region panel when added thereto.

A user can add Mini Region 5 (236) to the region panel 226 by clicking on Button 5 (212). Once Mini Region 5 (236) has been added to the region panel 226, Button 5 (212) can be visually altered (e.g., unshaded) in order to indicate that the corresponding Mini Region 5 (236) has been added to the region panel 226.

Figure 9:
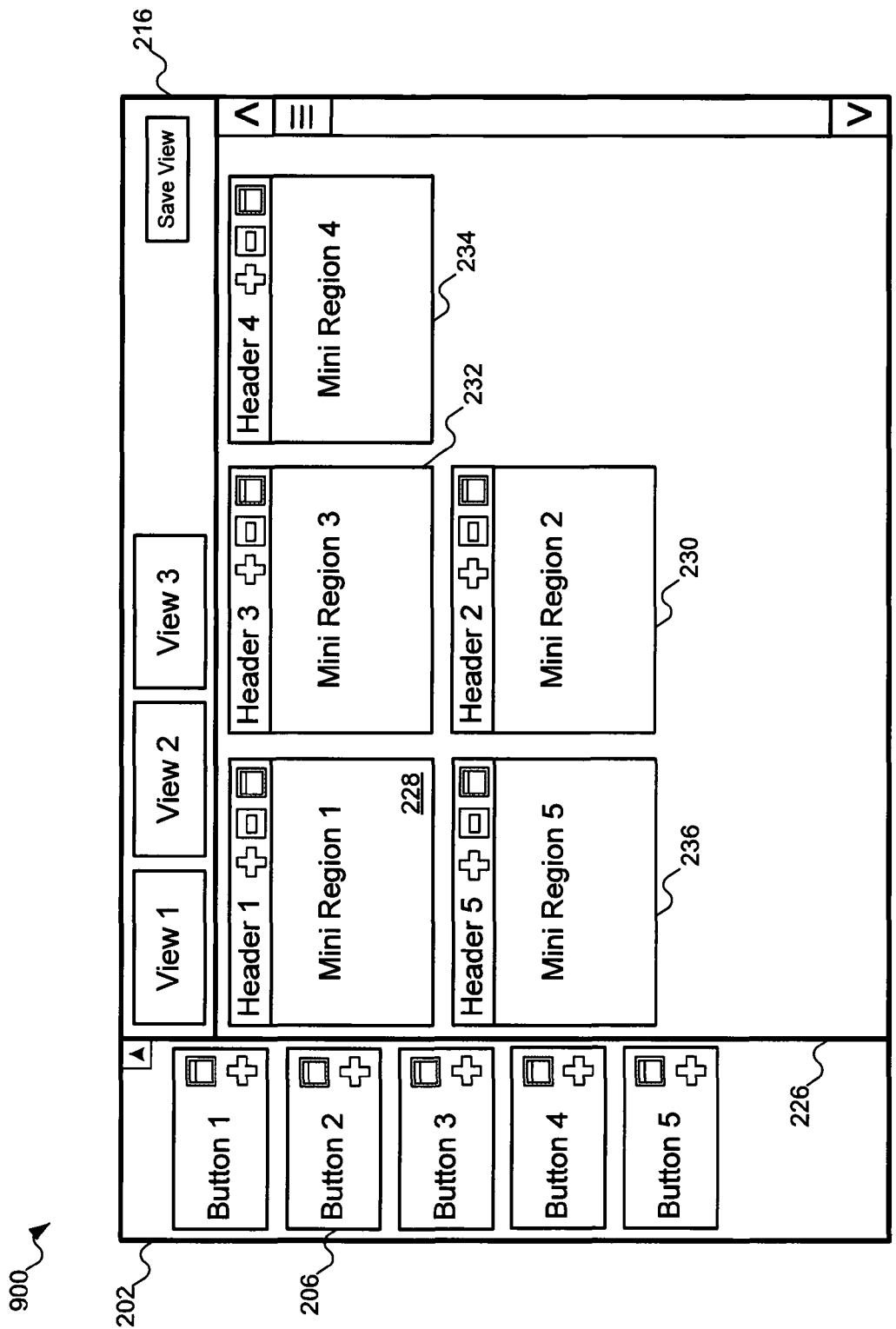
FIG. 9 illustrates an example of the adaptive region after the addition of another mini region, as displayed in accordance with implementations of the disclosed technology.

FIG. 9 illustrates an example of a screenshot 900 of the opportunity as displayed in FIG. 8 but after the re-insertion of Mini Region 2 (230) into the region panel 226. A user can re-add Mini Region 2 (230) to the region panel 226 by clicking on Button 2 (206).

In the example, Mini Region 2 (230) is added to the next space after Mini Region 5 (236), which is the "next available spot" (e.g., the space immediately following the last mini region in terms of display order—here, the last mini region before the addition of Mini Region 2 (230) is Mini Region 5 (236)).

Figure 10:
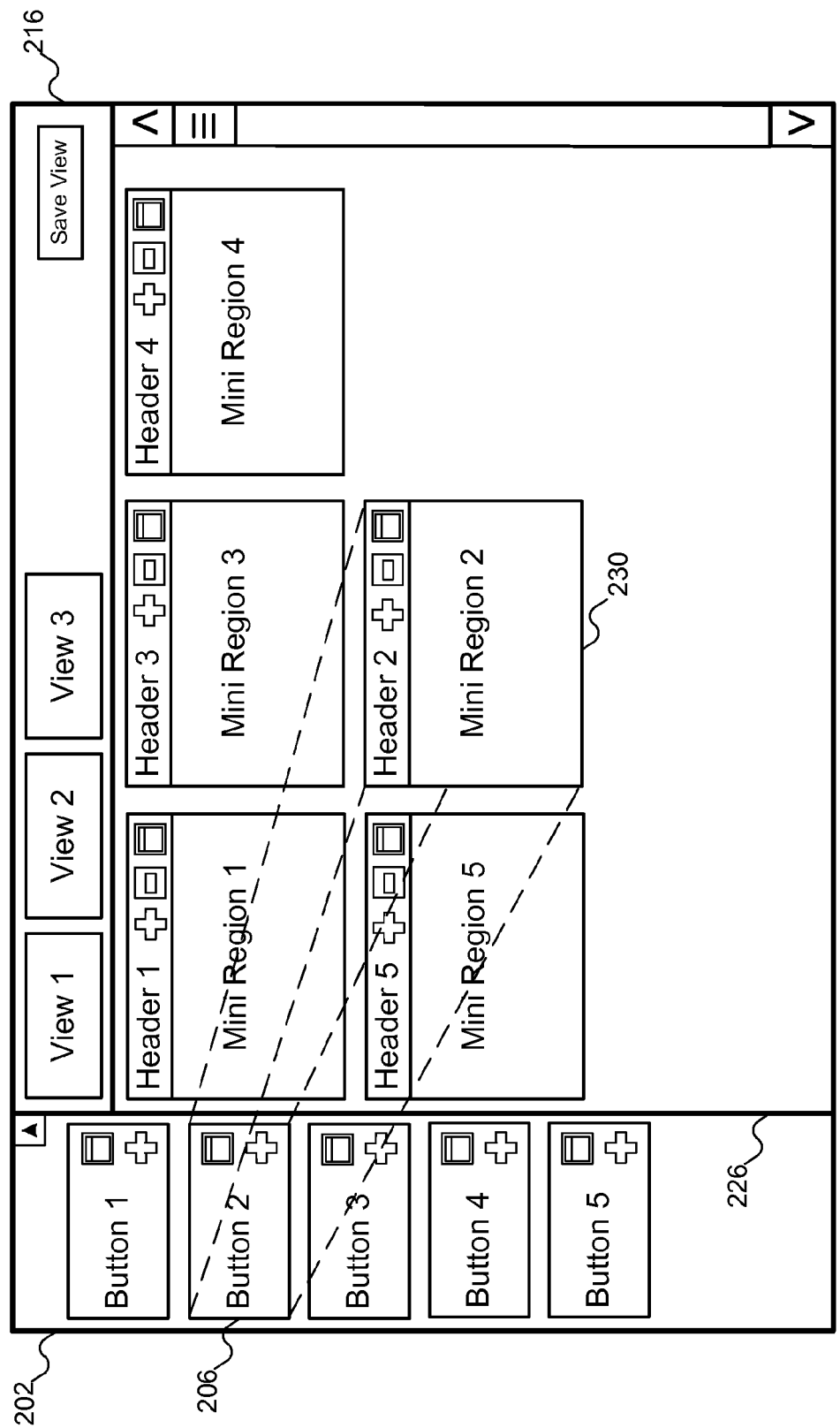
FIG. 10 illustrates an example of the transition the adaptive region can experience as part of the addition of a mini region, as displayed in accordance with implementations of the disclosed technology.

FIG. 10 illustrates an example of the transition the opportunity 200 can experience as part of the addition of Mini Region 2 (230) (e.g., as illustrated in FIG. 9) to the region panel 226. In the example, the addition of Mini Region 2 (230) to the region panel 226 is represented by an animated display that appears to show Mini Region 2 (230) coming out of the corresponding Button 2 (206) and travelling to the region panel 226.

One having ordinary skill in the art will appreciate that there is a wide variety of ways to perform the animation of such a transition and that the animated transition illustrated in FIG. 10 is but a single example and should not be treated as being limiting in any fashion. Also, there are various other types of actions that can be represented by an animated display such as, for example, the closing of a mini region, the minimizing of a mini region (e.g., to the button panel), the maximizing of a mini region, and the reorganization of mini regions (e.g., via drag-and-drop techniques to move a mini region from one location to another).

Figure 11:
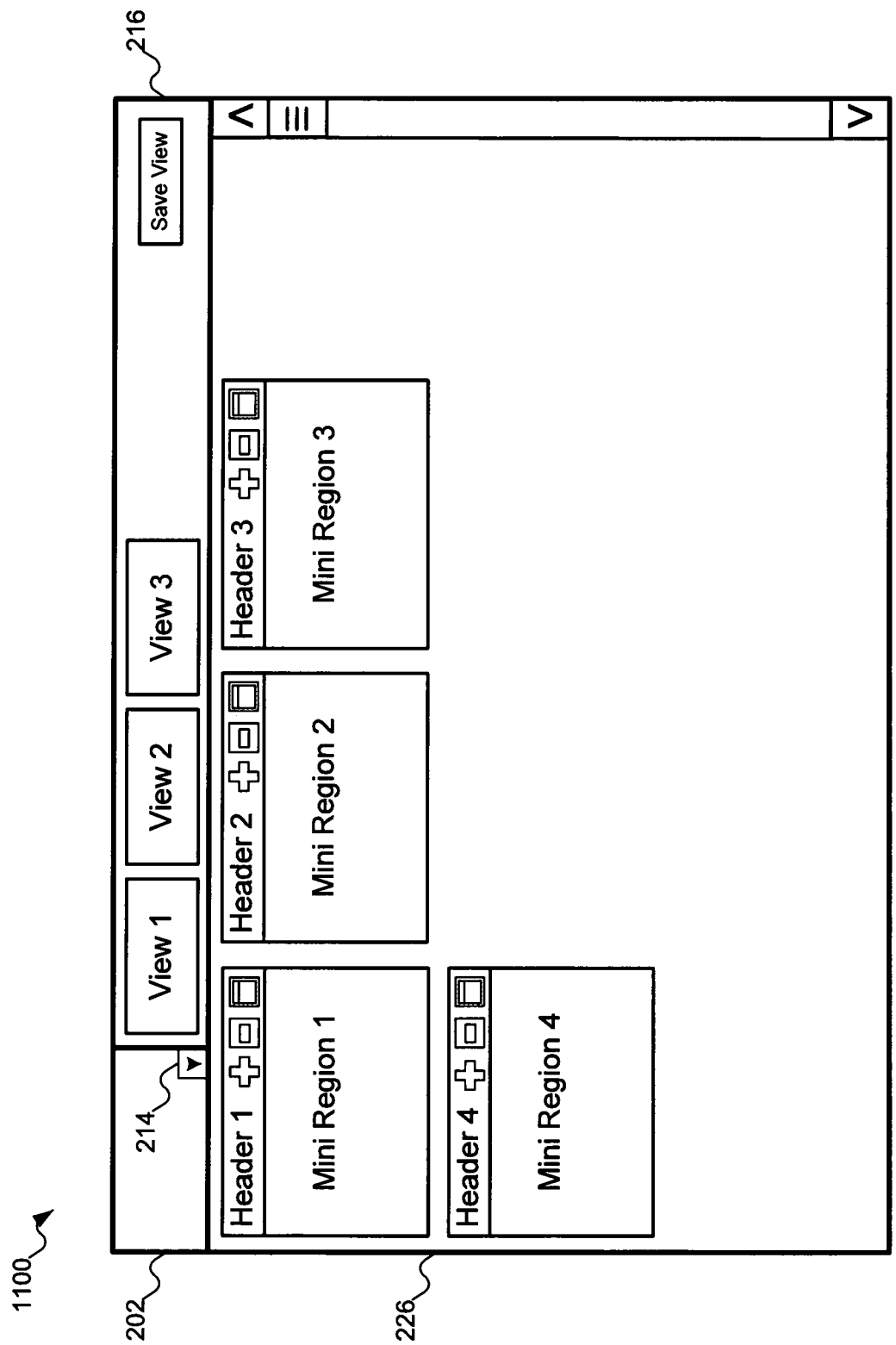
FIG. 11 illustrates an example of an adaptive region after the button panel has been collapsed, as displayed in accordance with implementations of the disclosed technology.

FIG. 11 illustrates an example of a screenshot 1100 of the opportunity 200 illustrated in FIG. 2 after the button panel 202 has been collapsed. In the example, the region panel 226 has expanded to "take over" some or all of the space that had been previously used by the button panel 202. Alternatively, the region panel 226 can remain in the same position (e.g., as illustrated in FIG. 2) regardless of whether the button panel 202 is expanded or collapsed.

There are multiple ways to expand or collapse the button panel 202. For example, a user can click on the expand/collapse button 214 or double-click on a certain portion (e.g., the top-most portion) of the button panel 202 itself.

The expand/collapse button 214 can also serve as a visual indicator as to the current state of the button panel 202. For example, the expand/collapse button 214 can be in a first position (e.g., a top position, as illustrated in FIG. 2) when the button panel 202 is expanded and, when the button panel 202 is collapsed, the expand/collapse button 214 can be in a second position (e.g., a bottom position, as illustrated in FIG. 11).

In certain implementations, the orientation of an arrow within the expand/collapse button 214 can also be used as an indicator. For example, the arrow can point in a first direction (e.g., in an upward-pointing orientation, as illustrated in FIG. 2) when the button panel 202 is expanded and, when the button panel 202 is collapsed, the arrow can point in a second direction (e.g., in a downward-pointing orientation, as illustrated in FIG. 11).

Figure 12:
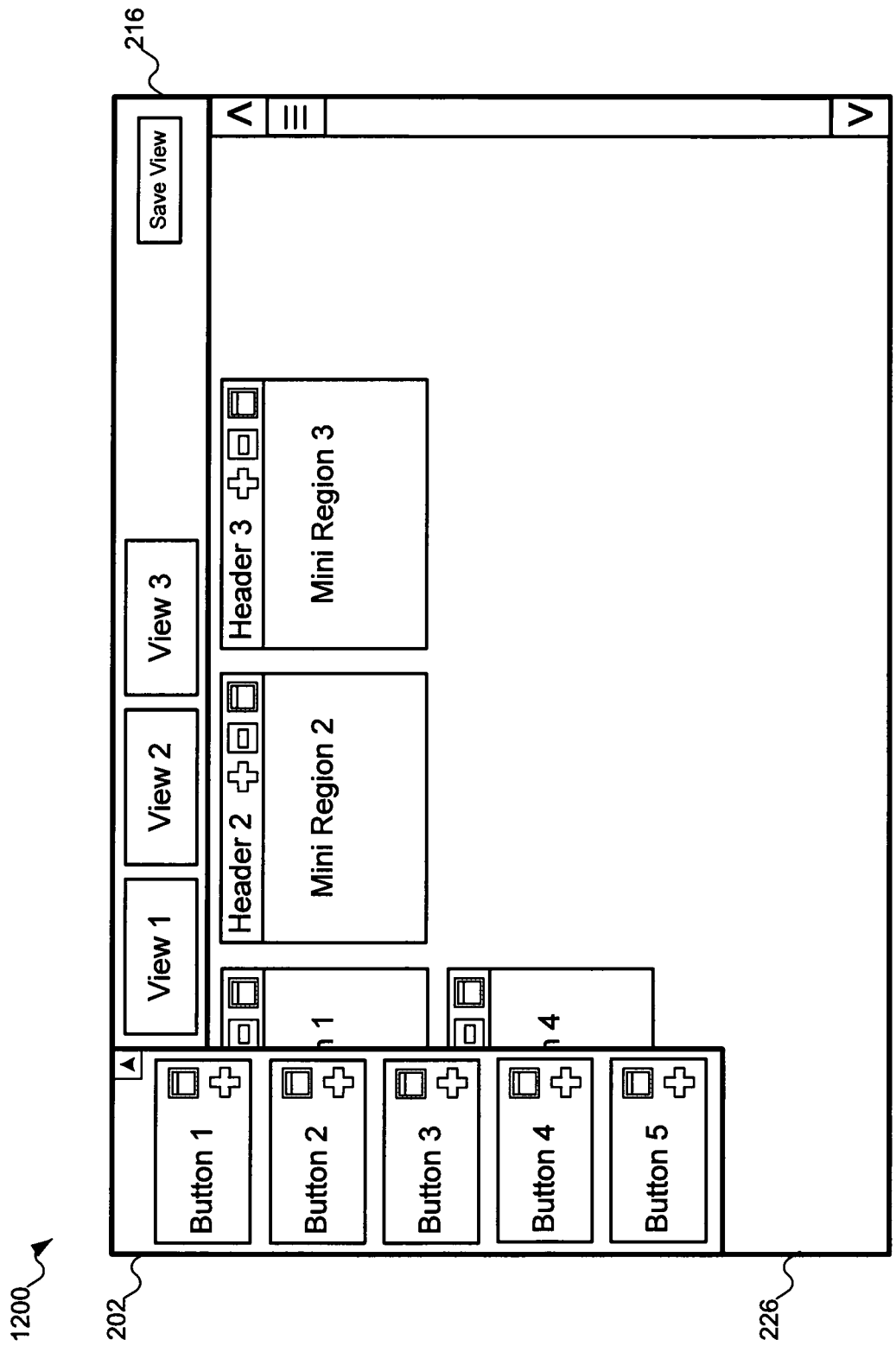
FIG. 12 illustrates an example of the adaptive region where the button panel is acting as a drop-down menu, as displayed in accordance with implementations of the disclosed technology.

FIG. 12 illustrates an example of a screenshot 1200 of the opportunity 200 where the button panel 202 is acting as a drop-down menu. That is, when a user shifts focus to the button panel 202, the button panel 202 is presented "on top of" the region panel 226 until the user either selects one of the buttons in the button panel 202 or clicks outside the button panel 202. If the user clicks outside the button panel 202, the button panel 202 returns to its original collapsed state and the click event is handled by whatever the user clicked on.

Figure 13:
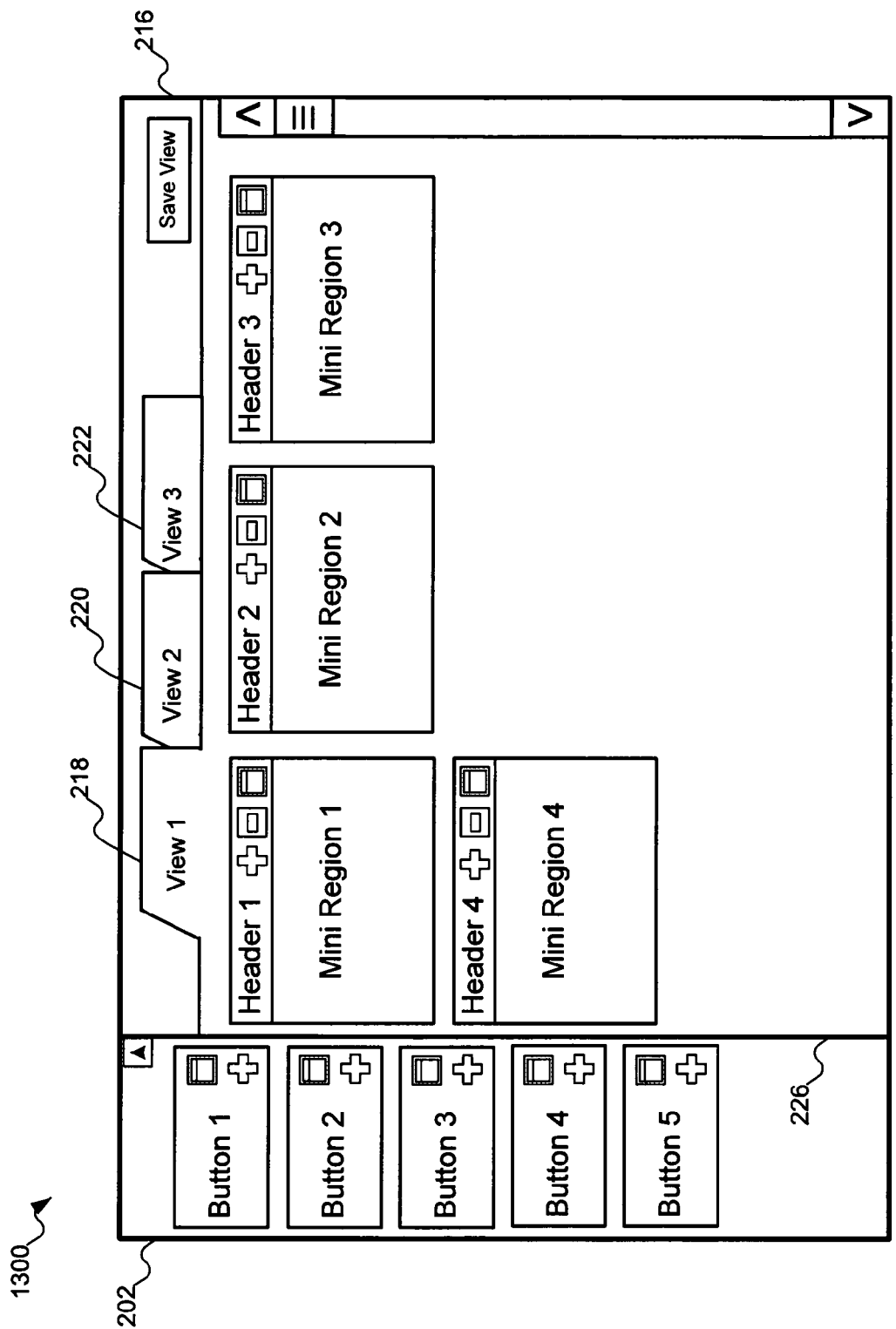
FIG. 13 illustrates an alternative example of the view panel of an adaptive region as displayed in accordance with implementations of the disclosed technology.

FIG. 13 is an example of a screenshot 1300 illustrating an alternative implementation of the view panel 216. In the example, the view buttons labeled "View 1-3" (218-222, respectively) are actually tabs. For example, when a view tab (e.g., "View 1" (218)) is selected, the corresponding view can be brought to the front. The other, non-displayed views can be "moved behind" the displayed view until the corresponding view tab is selected, for example.

In certain implementations, a user can change the order of the views (e.g., by performing drag-and-drop operations on the view tabs), rename a view (e.g., by single-clicking on the view tab label and then entering the desired name), delete a view, and/or perform copy/paste operations on the views.

One having ordinary skill in the art will appreciate that there is a wide variety of view types that each view can have. For example, a view can be one of the following types: Customer Details, Deal Development, and Products and Resources. These types are listed as examples only and should not be treated as being limiting in any fashion. Each view can generally represent the same sales opportunity but in a distinct (e.g., customized) format.

Figure 14:
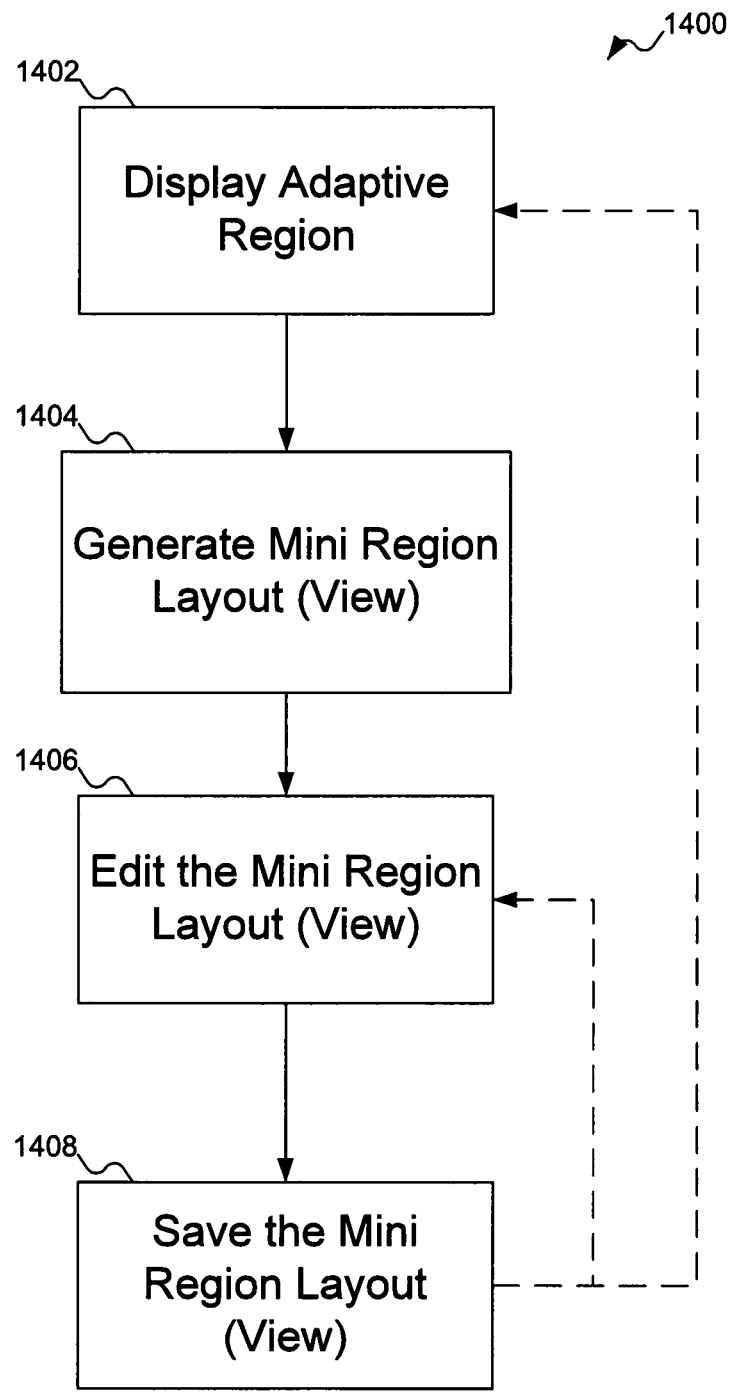
FIG. 14 is a flowchart illustrating an example of a method of interacting with an adaptive region in accordance with implementations of the disclosed technology.

Exemplary Methods in Accordance with Implementations of the Disclosed Technology FIG. 14 is a flowchart illustrating an example of a method 1400 of interacting with an adaptive region in accordance with implementations of the disclosed technology.

At 1402, an adaptive region is displayed. For example, the adaptive region can be displayed automatically (e.g., as part of the initialization of an Enterprise application) or manually (e.g., in response to a user action invoking the adaptive region). The adaptive region will generally have a button panel having multiple buttons, a view panel having multiple view buttons, and a region panel.

At 1404, a mini region layout is generated. For example, the mini region layout can be generated automatically (e.g., using a default layout or the layout last used by the particular user) or manually (e.g., in response to a user adding mini regions to the region panel).

At 1406, the mini region layout is edited. For example, a user can add mini regions to the region panel, remove mini regions from the region panel, or switch locations between multiple mini regions. The user can also maximize a particular mini region.

At 1408, the mini region layout is stored (e.g., in local memory or in external memory such as a portable memory device). Once the mini region layout is stored, the method can return to a previous step. For example, the method can return to 1402 or 1406, as indicated by the dashed lines in FIG. 14.

Figure 15:
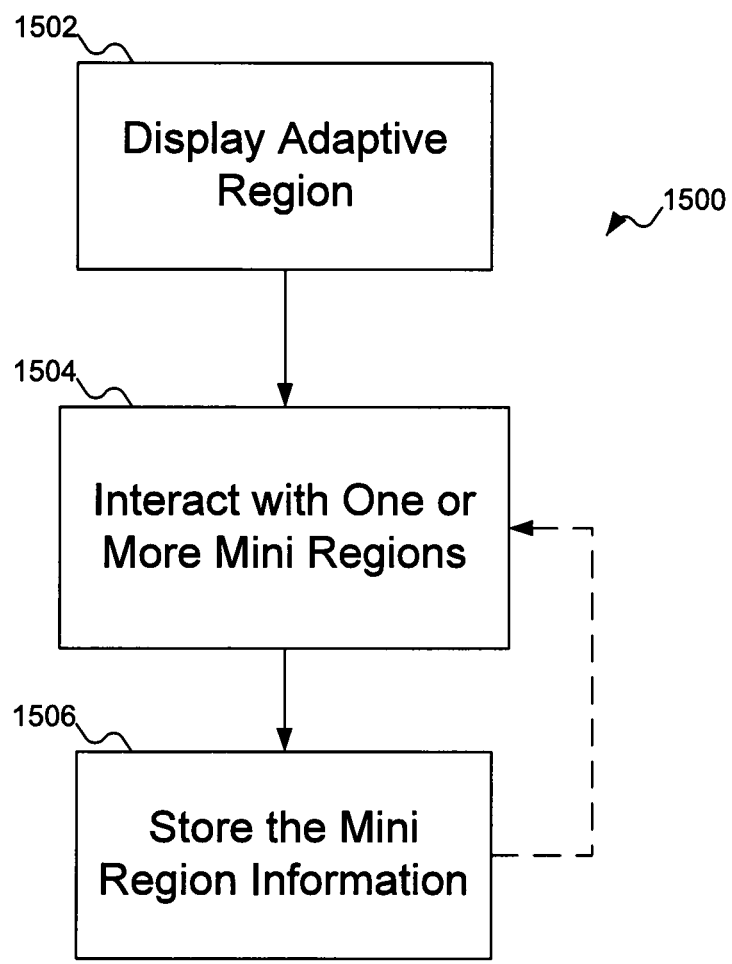
FIG. 15 is a flowchart illustrating another example of a method of interacting with an adaptive region in accordance with implementations of the disclosed technology.

FIG. 15 is a flowchart illustrating an example of another method 1500 of interacting with an adaptive region in accordance with implementations of the disclosed technology.

At 1502, an adaptive region is displayed. This step can be similar to step 1402 of FIG. 14, for example.

At 1504, one or more mini regions are interacted with. For example, a user can add information (e.g., sales or customer-related information) to a particular mini region. The user can also modify or delete information that was previously entered into the mini region.

At 1506, the mini region information is stored (e.g., in local memory or in external memory such as a portable memory device). Once the mini region information is stored, the method can return to a previous step such as 1504, as indicated by the dashed line in FIG. 15.

General Description of a Suitable Machine in which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. An adaptive region system, comprising:
a processor configured to control:
an adaptive region module comprising:
a mini region button panel module operable to generate a mini region button panel, wherein the mini region button panel comprises a plurality of mini region buttons;
a view panel module operable to generate a view panel, wherein the view panel comprises a plurality of view buttons; and
a region panel module operable to generate a region panel, wherein the region panel comprises a plurality of mini regions corresponding to a Sales Opportunity, wherein a layout of said mini regions is automatically determined based on strength values attached to said mini regions, and wherein a position of a mini region having the highest strength value in the layout is permanent;
a summary module operable to provide a summary section comprising information pertaining to the Sales Opportunity, said information comprising a group consisting of: Primary Owner, Territory, Revenue, Win Probability, Status, Creation Date, Close Date, and Lead Quality; and
a display operable to visually display at least some of the mini region button panel, at least some of the view panel, and at least some of the region panel.

2. The adaptive region system of claim 1, wherein each of the plurality of mini region buttons corresponds to one of the plurality of mini regions.

3. The adaptive region system of claim 1, further comprising a storing module operable to store settings information pertaining to at least one of the mini region button panel, the view panel, and the region panel.

4. The adaptive region system of claim 1, wherein each of the plurality of mini region buttons comprises at least one of a mini region maximize/minimize button and an add button.

5. The adaptive region system of claim 4, further comprising an add module operable to, responsive to an action performed in connection with the add button, invoke a user interface comprising multiple data fields, wherein each data field is operable to receive input.

6. The adaptive region system of claim 1, wherein each of the plurality of mini regions comprises at least one of a mini region maximize/minimize button, a minimize-to-button button, and an add button.

7. The adaptive region system of claim 6, further comprising an add module operable to, responsive to an action performed in connection with the add button, invoke a user interface comprising multiple data fields, wherein each data field is operable to receive input.

8. The adaptive region system of claim 1, wherein the mini region button panel further comprises a mini region button panel maximize/minimize button.

9. The adaptive region system of claim 1, wherein each of the plurality of view buttons corresponds to an arrangement of at least one of the mini region button panel, the view panel, and the region panel.

10. The adaptive region system of claim 1, wherein the view panel further comprises a Save View button operable to invoke a view storing module to store a customized configuration of a view.

11. The adaptive region system of claim 1, wherein the display comprises a monitor.

12. The adaptive region system of claim 1, wherein the layout specifies that the mini regions are to be displayed in a descending order of the strength values.

13. The adaptive region system of claim 1, wherein the position of the mini region having the highest strength value in the layout is permanent so long as the strength value remains the highest among the mini regions.

14. The adaptive region system of claim 1, wherein the position of the mini region having the highest strength value in the layout is within the uppermost, leftmost portion of the layout.

15. The adaptive region system of claim 1, wherein a position of a mini region having the highest strength value in the layout is permanent.

16. The adaptive region system of claim 15, wherein the position of the mini region having the lowest strength value in the layout is permanent so long as the strength value remains the lowest among the mini regions.

17. The adaptive region system of claim 1, wherein a position of a mini region having the lowest strength value in the layout is within the lowermost, rightmost portion of the layout.

18. A computer-implemented method, comprising:
displaying a region panel comprising a space operable to hold multiple mini regions corresponding to a Sales Opportunity;
attaching a strength value to each of the multiple mini regions within the region panel;
automatically arranging the mini regions in accordance with a layout based on the strength values of the mini regions, wherein a position of a mini region having the highest strength value in the layout is permanent;
displaying a mini region button panel comprising a plurality of mini region buttons, wherein each of the plurality of mini region buttons corresponds to one of the multiple mini regions;
displaying an adaptive region view panel comprising a plurality of adaptive region view buttons, wherein each of the plurality of adaptive region view buttons corresponds to an arrangement of the multiple mini regions within the region panel; and
displaying a summary section comprising information pertaining to the Sales Opportunity, said information comprising a group consisting of: Primary Owner, Territory, Revenue, Win Probability, Status, Creation Date, Close Date, and Lead Quality.

19. The computer-implemented method of claim 18, further comprising editing the layout.

20. The computer-implemented method of claim 19, further comprising storing the edited layout as a second layout.

21. The computer-implemented method of claim 19, wherein editing the layout comprises at least one of adding at least one of the multiple mini regions to the region panel and removing at least one of the multiple mini regions from the region panel.

22. The computer-implemented method of claim 19, wherein editing the layout comprises switching a first position of a first one of the multiple mini regions with a second position of a second one of the multiple mini regions.

23. The computer-implemented method of claim 18, further comprising adding content to one of the multiple mini regions responsive to an action corresponding to an add button.

24. One or more tangible computer-readable media storing computer-executable instructions that, when executed by a processor, perform a method comprising:

generating a mini region button panel having mini region buttons;
generating a view panel having view buttons;
generating a region panel;
placing multiple mini regions within the region panel as part of a first arrangement, wherein each mini region pertains to a Sales Opportunity, and wherein the first arrangement comprises a summary section comprising information pertaining to the Sales Opportunity, said information comprising a group consisting of: Primary Owner, Territory, Revenue, Win Probability, Status, Creation Date, Close Date, and Lead Quality, wherein said first arrangement is automatically determined based on strength values attached to the mini regions, and wherein a position of a mini region having the highest strength value in the first arrangement is permanent;
editing the first arrangement; and
storing the edited first arrangement.

* * * * *

UNITED STATES PATENT AND TRADEMARK OFFICE
CERTIFICATE OF CORRECTION

PATENT NO. : 8,769,436 B2  
APPLICATION NO. : 12/368948  
DATED : July 1, 2014  
INVENTOR(S) : Haire et al.

Page 1 of 1

It is certified that error appears in the above-identified patent and that said Letters Patent is hereby corrected as shown below:

Title Page:

Item (75) under Inventors, line 3, delete "Kari" and insert -- Karl --, therefor.

Signed and Sealed this  
Third Day of March, 2015

Michelle K. Lee  
*Deputy Director of the United States Patent and Trademark Office*